Patented Dec. 9, 1924.

1,518,225

UNITED STATES PATENT OFFICE.

LAURENCE P. SHARPLES, OF WEST CHESTER, PENNSYLVANIA.

MILKING MACHINE.

Application filed November 6, 1919. Serial No. 336,003.

*To all whom it may concern:*

Be it known that I, LAURENCE P. SHARPLES, a citizen of the United States, residing at West Chester, in the county of Chester and State of Pennsylvania, have invented certain Improvements in Milking Machines, of which the following is a specification.

This invention is designed to provide a milking machine of improved character in efficiency, flexibility, simplicity, convenience and portability.

It comprises, in its preferred form, a double acting reciprocating pump provided with automatic means whereby each stroke is made effective to produce the desired vacuum as also to maintain the same above a certain degree in a part of the apparatus requiring a continuous vacuum, alternate strokes are applied to holding the continuous vacuum, and alternate strokes are applied to creating a vacuum and pressure alternately in a different part of the apparatus to effect the desired pulsation. The apparatus comprises the combination of the pump with a motor connected therewith directly, a truck on which the pump and motor are mounted and a pail with usual connections, the truck being adapted for operation by one hand while the pail is carried by the other hand of the operator.

It will be understood that the details of the construction may be variously modified within the scope of the invention as defined by the claims.

The characteristic features of the invention are embodied in the machines set forth in the following description and the accompanying drawings in illustration thereof.

Figure 1:
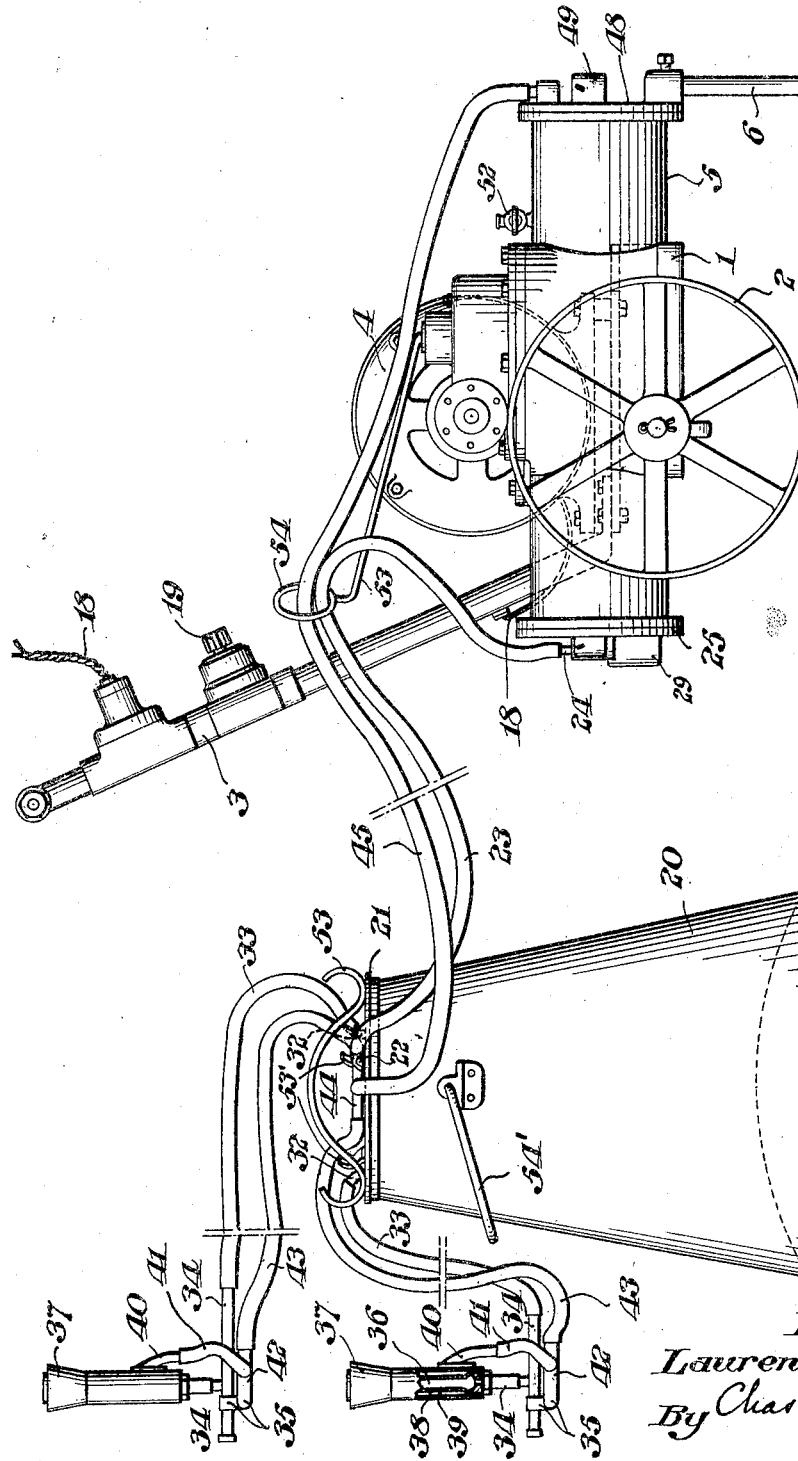
Figure 2:
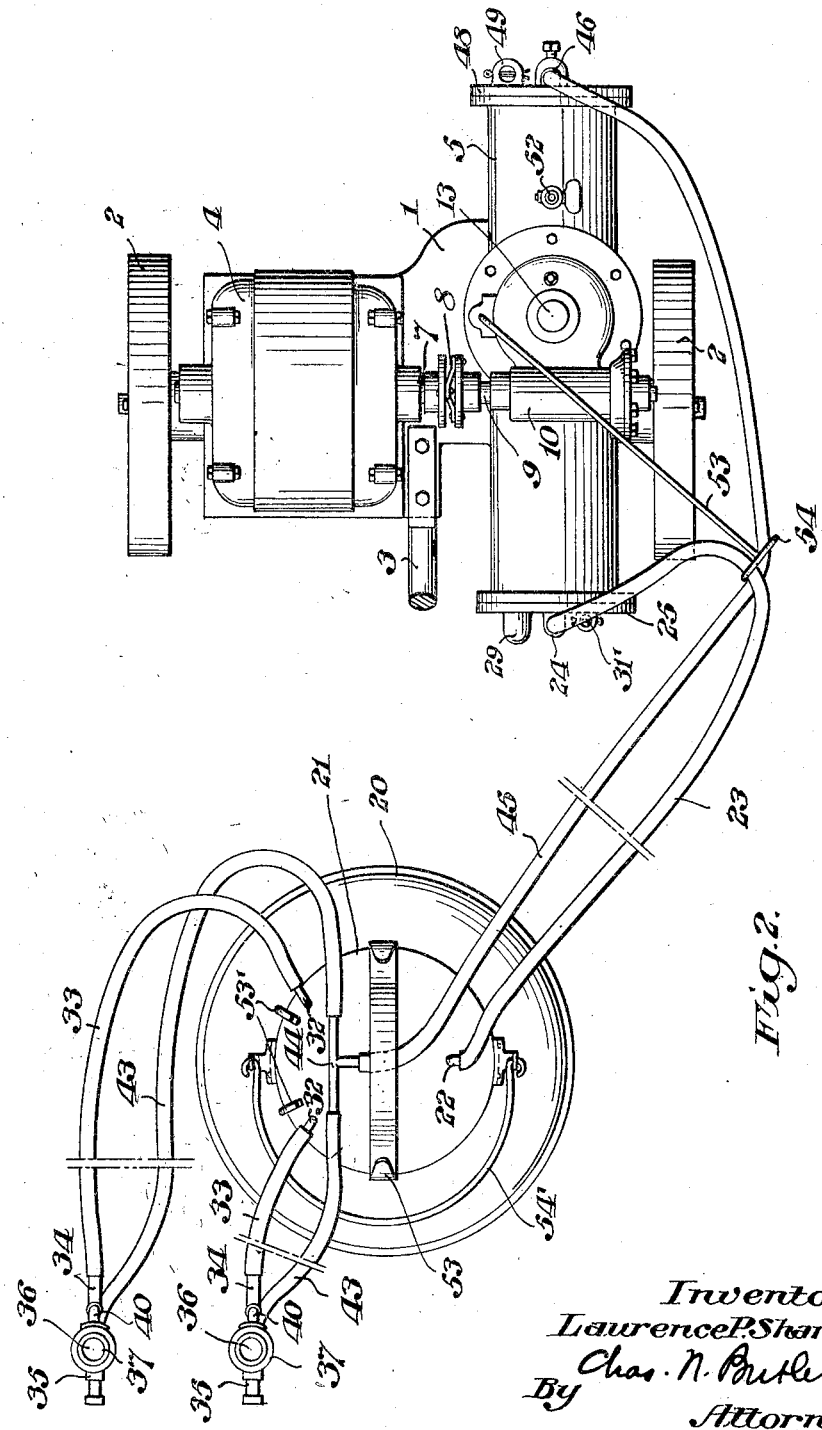
Figure 3:
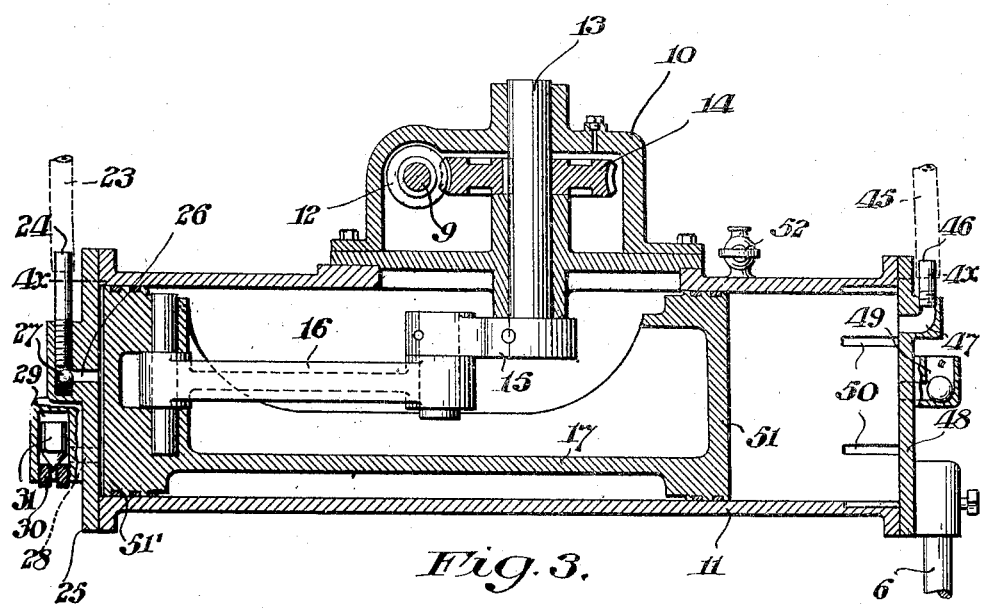
Figure 4:
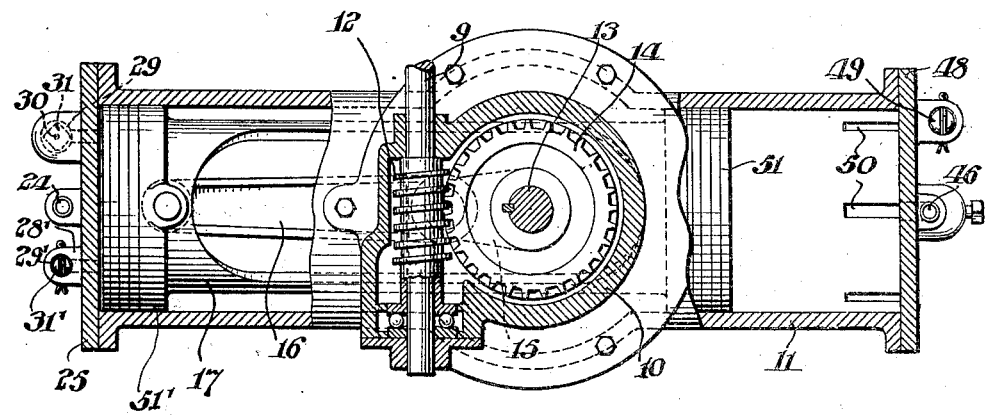
Figure 5:
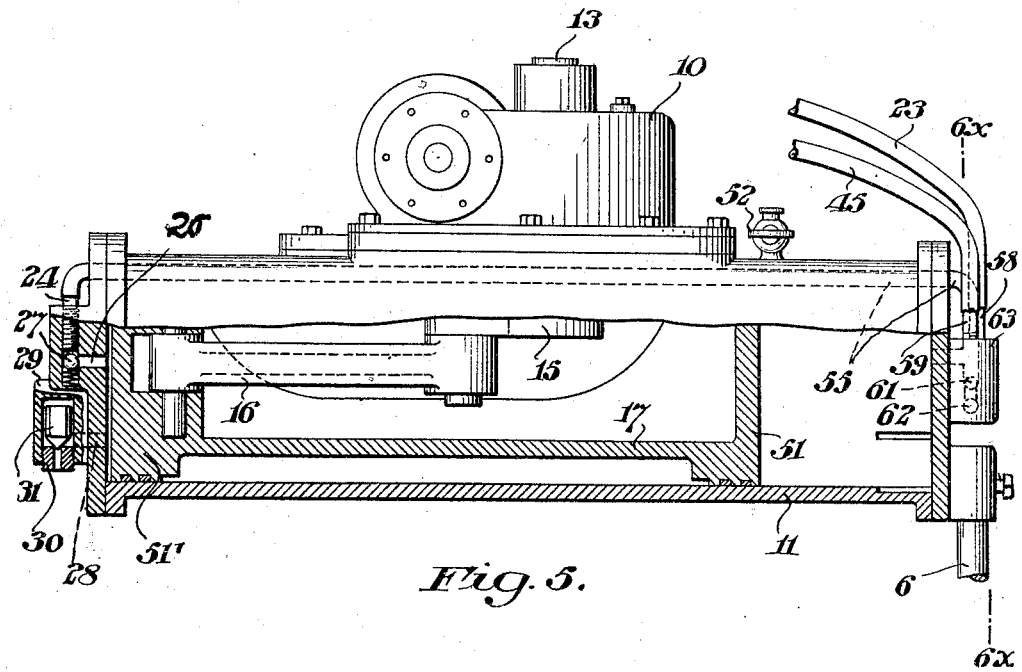
Figure 6:
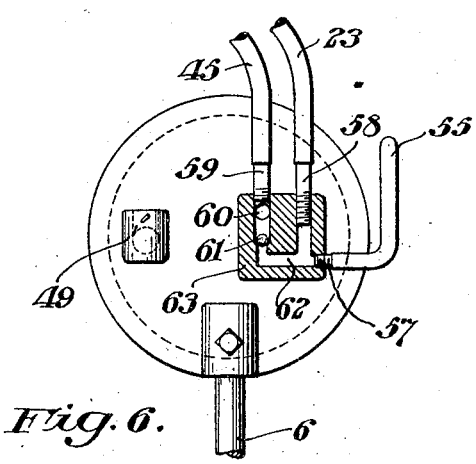

In the drawings, Fig. 1 is a broken side elevation of a form of apparatus embodying the invention; Fig. 2 is a plan view of the same; Fig. 3 is a horizontal sectional view taken through the axis of the pump; Fig. 4 is an irregular sectional view taken on the line 4×—4× of Fig. 3; Fig. 5 is an irregular longitudinal sectional view of a pump and connections illustrating a preferred form of the invention; and Fig. 6 is a sectional view taken through the end of the pump on the line 6×—6× of Fig. 5.

The invention, in the form thereof illustrated in Figs. 1 to 4 inclusive, comprises a frame 1 mounted on the wheels 2 and having a handle 3 for operating the truck thus formed.

An electric motor 4 and a pump 5 are mounted on the frame 1, the pump being provided with a leg 6 on the opposite side of the axis of the wheels from the handle 3, between which axis and leg is the center of gravity of the load carried by the wheels.

The armature shaft 7 of the motor 4 is connected by the flexible coupling 8 with the aligned pump shaft 9, which is journalled in the housing 10 mounted on the pump cylinder 11, the pump shaft having a worm 12 fixed thereon within said housing. A crank shaft 13, journalled in the housing 10, has a worm wheel 14 fixed thereon within said housing, this wheel being engaged and revolved by the worm 12. A crank arm 15, fixed on the shaft 12 and revolved thereby, acts through the connecting rod 16 to reciprocate the double acting piston 17 in the cylinder 11, which is separated into two active chambers thereby.

The motor 4 is operated by current introduced through the conductors 18, which pass through the handle 3 and transmit current under control of a switch 19 carried by the handle.

A pail 20, provided with an air tight cover 21, has its interior connected by a nipple 22 fixed to the cover with a flexible conduit 23, which is connected with a nipple 24 set in the cylinder head 25 and communicating through the passage 26 with the interior of the cylinder 11. A check valve 27 in the head 25 is adapted to close communication from the passage 26 to the nipple 24 to hold the vacuum created in the pail by the exhausting action of the piston through the conduit 23. The head is also provided with a passage 28 to a chamber 29 having an inlet 30 controlled by a check valve 31, for limiting the vacuum produced by the movement of the piston therefrom, and with a passage 28′ to a passage 29′ containing a check valve 31′ for closing the passage 28′ on the retraction of the piston therefrom while permitting the expulsion of air in the reverse movement.

Nipples 32 fixed to the cover 21 connect the interior of the pail with the flexible conduits 33 which are connected with the nipples 34 of claws 35, these nipples communicating with the inner chambers 36 of the teat cups 37 having the flexible walls 38.

The outer teat cup chambers 39, separated from the chambers 36 by the walls 38, are connected through the nipples 40 and the flexible coiduits 41 with the nipples 42 of the claws 35. The nipples 42 are connected through the flexible conduits 43 with the T-nipple 44 on the cover 21, the T-nipple being connected by the flexible conduit 45 with the nipple 46 communicating with the interior of the cylinder through the passage 47 in the cylinder head 48.

The cylinder head 48 is provided with the relief check valve 49 for limiting the pressure communicated through the conduit 45 and the cylinder is provided with the relief passages 50, adjacent to this head, to permit the escape of compressed air around the piston head 51 when in its position adjacent to the head 48, and thus secure atmospheric pressure in the compartments 39.

A cock 52 communicates with the interior of the cylinder in front of the rear position of the head 51 to regulate the pressure between the heads 48 and 51.

An arm 53, having a pivotal connection with the housing 10, is provided with an eye 54 through which the conduits 23 and 45 pass, the arm providing an intermediate support for these conduits and being movable to provide accommodation for the movement of the pail to different positions relative to the pump.

In moving the apparatus or when the teat cups are not in use, the conduits 33 are engaged on the hooks 53' carried by the cover, whereby the conduits are bent and closed, thus stopping the neutralization of the vacuum in the pail by cutting off communication with the atmosphere.

In moving the machine, the truck, with the motor 4 and pump 5 thereon, is tilted by drawing down the handle 3 and elevating the leg 6, when such machine can be wheeled from place to place.

In the milking operation, the motor 4 is started by closing the switch 19, whereupon the piston 17 is reciprocated through the mechanism described. In the movement of the piston which advances its head 51 and retracts its head 51', air is forced through the conduits 47, 46, 45, 44, 43, 42, 41 and 40 to provide the desired pressure in the outer teat cup compartments 39, which pressure is regulated by the valve 49 and relieved through the passages 50 at the limit of the forward movement, the relief providing atmospheric pressure in the compartments 39. As the head 51' is retracted, air is sucked into the cylinder through the conduits 26, 24, 23, 22, 20, 32, 33 and 34, exhausting the pail 20 and the inner teat cup compartments 36, the suction being limited to that desired by the relief valve 31. In the reverse stroke, the rearwardly moving piston head 51 exhausts the outer teat cup compartments 39 through the conduits 47, 46, 45, 44, 43, 42, 41 and 40, and, as the head 51' advances simultaneously therewith, the check valve 27 rises to close the nipple 24 and hold the vacuum in the pail 20 and the teat cup compartment 36, the valve 31' automatically opening to relieve the pressure in front of the head 51'.

In the modified and preferred construction illustrated in Figs. 5 and 6, the nipple 24 is connected with a nipple 57 by a tube 55. The nipple 57 connects with a passage 62 in the boss 63. The passage 62 connects directly with a nipple 58 from which the flexible tube 23 leads to nipple 22 on pail lid 21. A port 60 connects the interior of cylinder with the nipple 59 and also with the passage 62 when the check valve 61 lifts off its seat. The nipple 59 connects by means of a flexible conduit 45 with the T-nipple 44.

In operation, upon starting the pump, each stroke of the piston has an exhausting action on the pail and reduces by nearly one half the time otherwise required for exhausting the pail, the vacuum conduits being bent or otherwise closed adjacent to the teat cups initially as described. As the piston head 51' is retracted it exhausts air through the conduits 26, 24, 55, 57, 23, 20 and 33, the valve 27 being depressed by the suction to open the nipple 24. In the reverse movement of the head 51', the valve 27 closes to hold the vacuum in the conduit 55, and the valve 31 is elevated to permit the escape of air through the passages 28 and 29 (Fig. 3). The rearwadly moving head 51 exhausts air through the conduits 60, 59, 45, 44, 43, 42, 41 and 40 from the chambers 39 until the vacuum in the conduit 59 is a little higher than the vacuum in the conduit 62, after which time the valve 61 rises and vacuum continues to be drawn from both 59 and 62 and the conduits connected therewith until the head reaches the limit of its rearward stroke. In the forward movement of the head 51, the valve 61 closes, and pressure is transmitted through the passages 59, 45, 43, 42, 41 and 40, being limited by the relief valve 49. At the forward end of the stroke, the compressed air escapes from 39, 40, 41, 42, 43, 45, 59 and 60 through the passages 50.

When the desired vacuum or degree of exhaustion has been obtained thus in the pail, the valve 31 will lift, affording the proper relief.

The teat cups having been applied and the pail provided with the desired vacuum, the milking operation is effected by the exhaustion of the teat cup compartments 36 through the conduits 33, 20, 23, 55 and 60 due to the rearward movements of the heads 51' and 51; and by the alternating exhaustion and pressure in the teat cup compartments 39 through the conduits 43, 45, 59 and 60 due to the reciprocations of the head 51.

Having described my invention, I claim:

1. In a milking machine, the combination of a vacuum conduit; a vacuum and pressure conduit; a double acting reciprocating pump provided with means comprising automatically acting valve mechanism whereby each stroke applies suction to said conduit first named and alternate strokes apply suction to said conduit second named below a predetermined vacuum in said conduit first named and thereafter the respective strokes apply suction to the respective conduits alternately.

2. In a milking machine, the combination of a continuous-vacuum conduit; an intermittent-vacuum conduit; a pump comprising a cylinder containing a double acting piston, means for connecting each end of said cylinder with and applying suction therefrom to said conduit first named, means for connecting said cylinder with and applying suction therefrom to the other of said conduits and valve mechanism for automatically disconnecting said conduit first named from one end of said cylinder for the purpose specified.

Signed at West Chester, in the county of Chester, and State of Pennsylvania, this 3rd day of November, 1919.

L. P. SHARPLES.